US011270170B2

(12) United States Patent
Sless et al.

(10) Patent No.: US 11,270,170 B2
(45) Date of Patent: Mar. 8, 2022

(54) OBJECT DETECTION USING LOW LEVEL CAMERA RADAR FUSION

(71) Applicant: GM GLOBAL TECHNOLOGY OPERATIONS LLC, Detroit, MI (US)

(72) Inventors: Liat Sless, Tel Aviv (IL); Gilad Cohen, Herzliya (IL); Shaul Oron, Rehovot (IL); Bat El Shlomo, Hod Hasharon (IL); Roee Lahav, Mishmar-David (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 16/822,833

(22) Filed: Mar. 18, 2020

(65) Prior Publication Data

US 2021/0295113 A1 Sep. 23, 2021

(51) Int. Cl.
| | |
|---|---|
| *G06K 9/62* | (2006.01) |
| *G01S 13/86* | (2006.01) |
| *G06T 7/50* | (2017.01) |
| *G06K 9/20* | (2006.01) |
| *G06K 9/00* | (2022.01) |
| *G01S 7/41* | (2006.01) |
| *G06T 7/20* | (2017.01) |

(52) U.S. Cl.
CPC ............ *G06K 9/6288* (2013.01); *G01S 7/414* (2013.01); *G01S 7/415* (2013.01); *G01S 7/417* (2013.01); *G01S 13/867* (2013.01); *G06K 9/00791* (2013.01); *G06K 9/2054* (2013.01); *G06T 7/20* (2013.01); *G06T 7/50* (2017.01); *G06K 2209/21* (2013.01); *G06T 2207/10028* (2013.01); *G06T 2207/20081* (2013.01); *G06T 2207/20084* (2013.01); *G06T 2207/30252* (2013.01)

(58) Field of Classification Search
CPC ............ G06K 9/6288; G06K 9/00791; G06K 9/2054; G06K 2209/21; G06K 9/00805; G06K 9/6273; G06K 9/6293; G01S 7/414; G01S 7/415; G01S 7/417; G01S 13/867; G01S 13/931; G06T 7/20; G06T 7/50; G06T 2207/10028; G06T 2207/20081; G06T 2207/20084; G06T 2207/30252
See application file for complete search history.

(56) References Cited

U.S. PATENT DOCUMENTS

| | | | |
|---|---|---|---|
| 2019/0065878 A1* | 2/2019 | Zeng | G06K 9/3233 |
| 2021/0103781 A1* | 4/2021 | Vigren | G01S 13/867 |
| 2021/0117701 A1* | 4/2021 | Janardhana | G01S 13/867 |

OTHER PUBLICATIONS

Zhang, X. (Apr. 29, 2020). Simple Understanding of Mask RCNN—Xiang Zhang. Medium. https://alittlepain833.medium.com/simple-understanding-of-mask-rcnn-134b5b330e95 (Year: 2018).*

* cited by examiner

*Primary Examiner* — Siamak Harandi
(74) *Attorney, Agent, or Firm* — Cantor Colburn LLP

(57) ABSTRACT

A vehicle, system and method of detecting an object. The system includes an image network, a radar network and a head. The image network receives image data and proposes a boundary box from the image data and an object proposal. The radar network receives radar data and the boundary box and generates a fused set of data including the radar data and the image data. The head determines a parameter of the object from the object proposal and the fused set of data.

20 Claims, 10 Drawing Sheets

OBJECT DETECTION USING LOW LEVEL CAMERA RADAR FUSION

INTRODUCTION

The subject disclosure relates to systems and methods for detecting an object and, in particular, to determining various parameters of the object based on a fusion of radar data and image data related to the object.

An autonomous vehicle is able to navigate its surroundings, in part, by accurately detecting and determining parameters of various objects within its surroundings. The autonomous vehicle includes detector systems which obtain measurements from their surroundings. These detector systems can include, for example, cameras, radar, Lidar, etc. There is often a desire to obtain more information about an object than can be provided by each detector system on its own. Accordingly, it is desirable to combine data from different detector systems in order to determine additional parameters.

SUMMARY

In one exemplary embodiment, a method of detecting an object at a vehicle is disclosed. Image data related to the object is received at an image neural network. A boundary box is proposed for the object from the image data. An object proposal is generated from the image data. Radar data related to the object and the boundary box are received at a radar data neural network. A fused set of data including the radar data and the image data is generated at the radar data neural network. A parameter of the object is detected from the object proposal and the fused set of data.

In addition to one or more of the features described herein, the method includes determining a foreground/background score for the boundary box at the radar data neural network. A two-dimensional velocity vector of the object is determined from the image data and radar data. An observation angle is determined for a proposed three-dimensional boundary box, a radial velocity of the object is determined from the fused set of data, and the two-dimensional velocity vector is determined using the observation angle and the radial velocity. A depth head that is trained with radar data and image data to determine a range of an object can be used to determine the range of the object using only the image data. The parameter of the object includes at least one of a classification score for the object, a dimension of the boundary box, an observation angle of the object, a depth of the object, and a two-dimensional velocity of the object. The radar data further includes a plurality of radar frames that are temporally spaced from each other, and the plurality of radar frames are aggregated and then fused with the image data to obtain the fused set of data.

In another exemplary embodiment, a system for detecting an object at a vehicle is disclosed. The system includes an image network that receives image data and proposes a boundary box from the image data and an object proposal, a radar network that receives radar data and the boundary box and generates a fused set of data including the radar data and the image data, and a head that determines a parameter of the object from the object proposal and the fused set of data.

In addition to one or more of the features described herein, the radar network is further configured to determine a foreground/background score for the boundary box. In one embodiment, a velocity head determines a two-dimensional velocity vector of the object from the image data and the radar data. An observation angle head is configured to determine an observation angle for a proposed three-dimensional boundary box, and the velocity head determines a radial velocity of the object from the fused set of data and the two-dimensional velocity vector using the observation angle and the radial velocity. A depth head includes a trained network, wherein the trained network determines a range of the object using only the image data. The parameter of the object further includes at least one of a classification score for the object, a dimension of the boundary box, an observation angle of the object, a depth of the object, and a two-dimensional velocity of the object. The system further includes a temporal aggregator configured to aggregate a plurality of temporally spaced radar frames.

In yet another exemplary embodiment, a vehicle is disclosed. The vehicle includes an image network that receives image data and proposes a boundary box from the image data and an object proposal, a radar network that receives radar data and the boundary box and generates a fused set of data including the radar data and the image data, and a head that determines a parameter of the object from the object proposal and the fused set of data.

In addition to one or more of the features described herein, the radar network is further configured to determine a foreground/background score for the boundary box. A velocity head determines a two-dimensional velocity vector of the object from the image data and the radar data. An observation angle head determines an observation angle for a proposed three-dimensional boundary box, and the velocity head determines a radial velocity of the object from the fused set of data and the two-dimensional velocity vector using the observation angle and the radial velocity. A depth head includes a trained network, wherein the trained network determines a range of the object using only the image data. The parameter of the object further includes at least one of a classification score for the object, a dimension of the boundary box, an observation angle of the object, a depth of the object, and a two-dimensional velocity of the object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
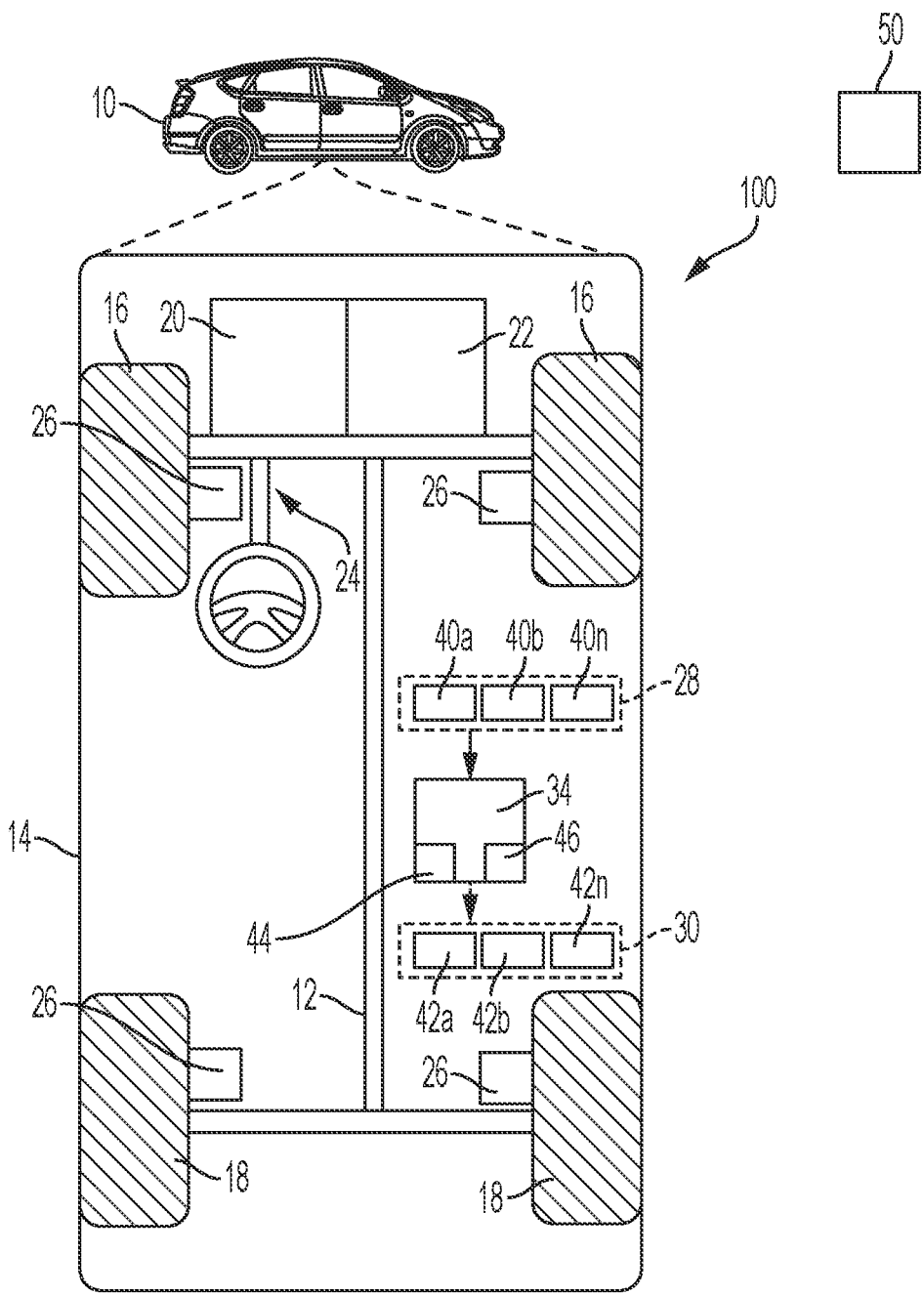
FIG. 1 shows an autonomous vehicle with an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 10 with an associated trajectory planning system depicted at 100 in accordance with various embodiments. The vehicle 10 is an autonomous vehicle in various embodiments. In general, the trajectory planning system 100 determines a trajectory plan for automated driving of the autonomous vehicle 10. The vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The front wheels 16 and rear wheels 18 are each rotationally coupled to the chassis 12 near respective corners of the body 14.

In various embodiments, the trajectory planning system 100 is incorporated into the autonomous vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects within the vehicle's environment, such as object 50. The object 50 can be, but is not limited to, other vehicles, pedestrians, bicycles, motorcycles, etc., as well as non-moving objects. The sensing devices 40a-40n can also obtain traffic data, such as information regarding traffic signals and signs, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The at least one controller 34 includes at least one processor 44 and a computer readable storage device or media 46. The processor 44 can be any custom made or commercially available processor, a central processing unit (CPU), a graphics processing unit (GPU), an auxiliary processor among several processors associated with the at least one controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the at least one controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the vehicle 10 based on the logic, calculations, methods, and/or algorithms. In one embodiment, data from sensing devices 40a-40n are communicated to processor 44. Processor 44 operates various methods disclosed herein to detect an object and determine various parameters of the object. The detection and parameters can be used to navigate the vehicle with respect to the object.

Figure 2:
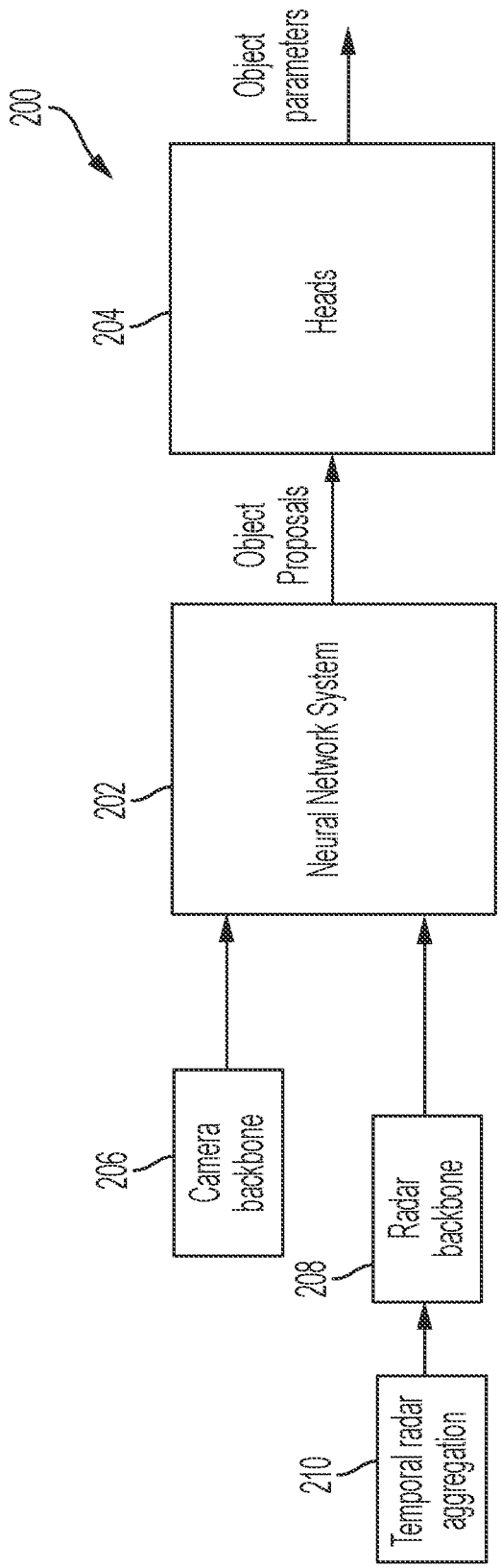
FIG. 2 shows a schematic diagram of an object detection system operable on the processor of the vehicle of FIG. 1.

FIG. 2 shows a schematic diagram of an object detection system 200 operable on the processor 44 of the vehicle 10 of FIG. 1, in an embodiment. The object detection system 200 includes a neural network system 202 and a plurality of heads 204. The neural network system 202 receives both image data related to the object from a camera backbone 206 and radar data related to the object from a radar backbone 208. The neural network system 202 processes the image data and the radar data in order to identify features and regions within the image data that can be proposed to the plurality of heads 204 in order to detect the object. Object proposals created at the neural network system 202 are sent to the plurality of heads 204. The plurality of heads 204 determines various parameters of the object 50 from the object proposals, such parameters including a classification of the object, a location and size of the object, an observation angle of the object, a range of the object and a two-dimensional velocity vector for the object.

The camera backbone 206, in an embodiment, includes a digital camera with a charge coupled device (CCD) having an array of pixels for recording image data. The image data includes the locations of the pixels within the array and color values (e.g., red, blue, green) recorded at the pixels.

The radar backbone 208 includes a radar system and other radar equipment. The radar data includes a radar point cloud which can be processed to provide various radar parameters, such as range, azimuth angle, elevation angle and radial velocity or Doppler frequency. The radar parameters can be obtained over a plurality of radar frames that are spaced apart temporally from each other over a selected time period. Alternatively, the radar parameters can be obtained over a plurality of radar sensors that are spatially separated. A temporal radar aggregator module 210 aggregates the radar data from the plurality of radar frames, thereby reducing data noise and correcting for any sparseness of data points. The temporal radar aggregator module 210 also compensates for motion of the vehicle over the selected time period.

Figure 3:
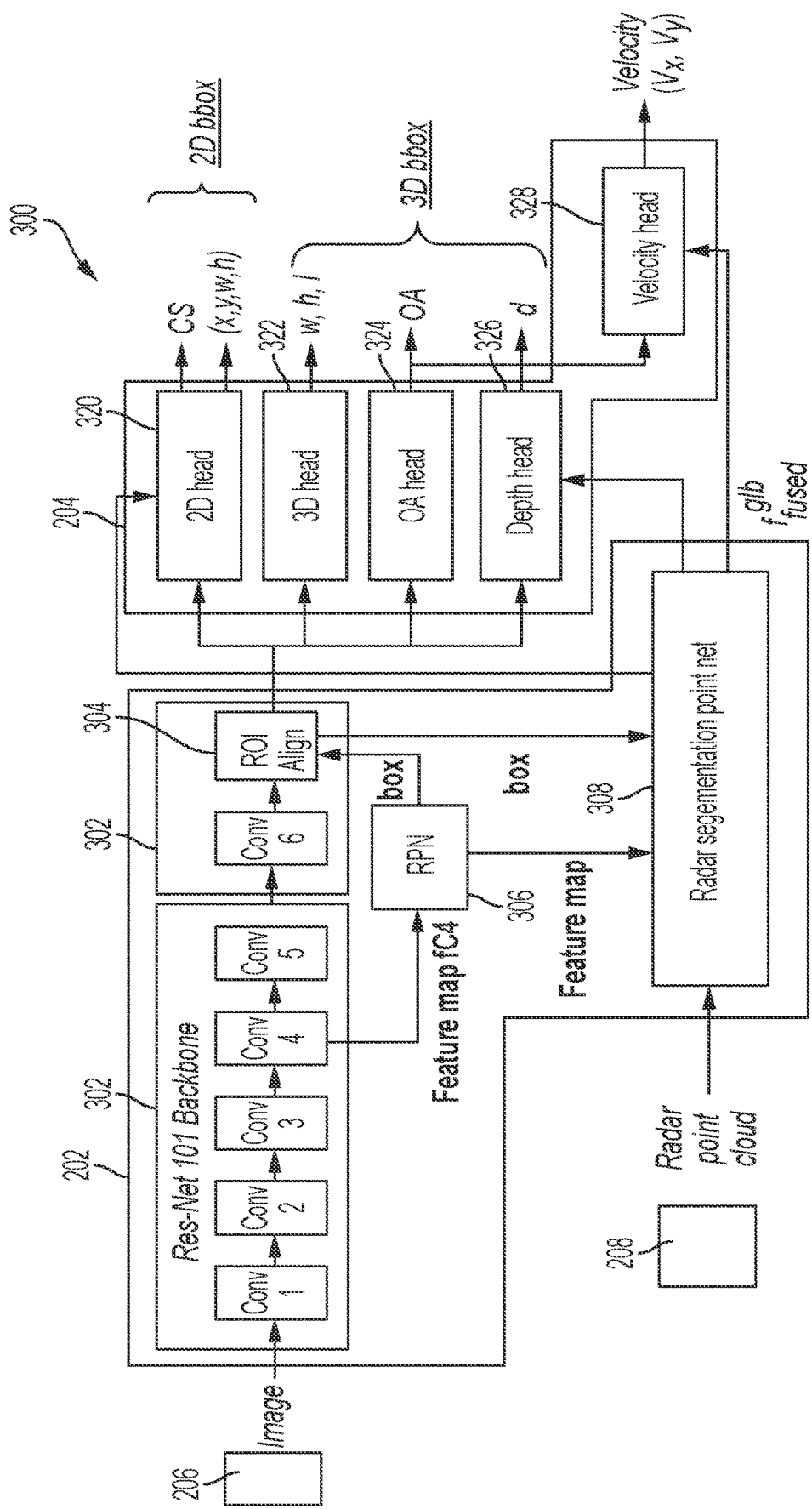
FIG. 3 shows a schematic diagram displaying details of the neural network system and the plurality of heads of the object detection system of FIG. 2.

FIG. 3 shows a schematic diagram 300 displaying details of the neural network system 202 and the plurality of heads 204 of the object detection system 200 of FIG. 2. The neural network system 202 includes an image neural network 302, a region proposal network (RPN) 306 and a radar data neural network 308.

In various embodiments, the image neural network 302 can be a convolutional neural network (CNN), such as a ResNet 101 network. The CNN includes a plurality of convolutional network layers. In the illustrative embodiment, the CNN includes convolutional network layers Conv1, . . . , Conv6, although this number of layers is meant to be illustrative and not to be a limitation on the invention.

The image neural network 302 receives the image data from the camera backbone 206 and sends the image data through the convolutional network layers in order to extract a feature from the image data. Data can be pulled from an intermediate convolutional layer for separate processing. In the illustrative embodiment, network layer data is pulled from the fourth convolutional network layer (Conv4) and sent to the RPN 306. The RPN 306 proposes a boundary box for the received network layer data and sends the proposed boundary box to a region of interest (ROI) alignment module 304 of the image neural network 302. The ROI alignment module 304 compares the proposed boundary box to image data from the last convolutional network layer (e.g., Conv6) of the image neural network 302 and adjusts a size of the proposed boundary box in order to isolate a feature of the object within the final network layer data.

The radar data neural network 308 receives radar point cloud data from the radar backbone 208, the boundary box from the RPN 306 and the selected feature at the ROI alignment module 304. The radar data neural network 308 generates a fused data set including image data and radar data and also determines a foreground/background score for the received feature. The foreground background score is a probability that indicates the likelihood that the feature is one of a background of the image or a feature of the object (i.e., a foreground feature). The radar data neural network 308 can be a convolutional neural network (CNN) in various embodiments.

The data from the ROI alignment module 304 is provided to one or more heads 204 and are used to calculate various parameters for the object. In particular, the ROI alignment module 304 outputs various object proposals, such as a two-dimensional boundary box, a three-dimensional boundary box as well as object feature information. The radar data neural network 308 can output a fused set of data $f_{fused}{}^{glb}$ that includes a fusion of the radar data and the image data, as well as background/foreground data.

The heads 204 include various heads for determining parameters of an object from the data from the neural network system 202. These heads include, but are not limited to, a two-dimensional (2D) head 320, three-dimensional (3D) head 322, observation angle head 324, depth head 326, and a velocity head 328. The two-dimensional head 320 receives a two-dimensional boundary box from the ROI alignment module 304 as well as the fused set of data $f_{fused}{}^{glb}$ from the radar data neural network 308. The 2D head 320 outputs a location and dimensions of the boundary box within an image. The two-dimensional head 320 also generates a classification score (CS) for the feature within the two-dimensional boundary box.

The 3D head 322 receives a 3D boundary box and determines a width, height and length dimension for the 3D boundary box. The observation angle head 324 receives the 3D boundary box and determines an orientation of the 3D boundary box (and thus, of the object within the 3D boundary box) with respect to a line of sight between the vehicle and the object. The depth head 326 receives the 3D boundary box as well as the fused data set from the radar data neural network 308 and outputs a range from the vehicle to the object based on this data.

For input, the velocity head 328 receives at least the observation angle from the observation angle head 324 and the fused set of data from the radar data neural network 308. The velocity head 328 outputs a full two-dimensional velocity vector for the object within the 3D boundary box based on this data. The two-dimensional velocity vector includes both $v_x$ and $v_y$ components of the velocity of the object.

Figure 4:
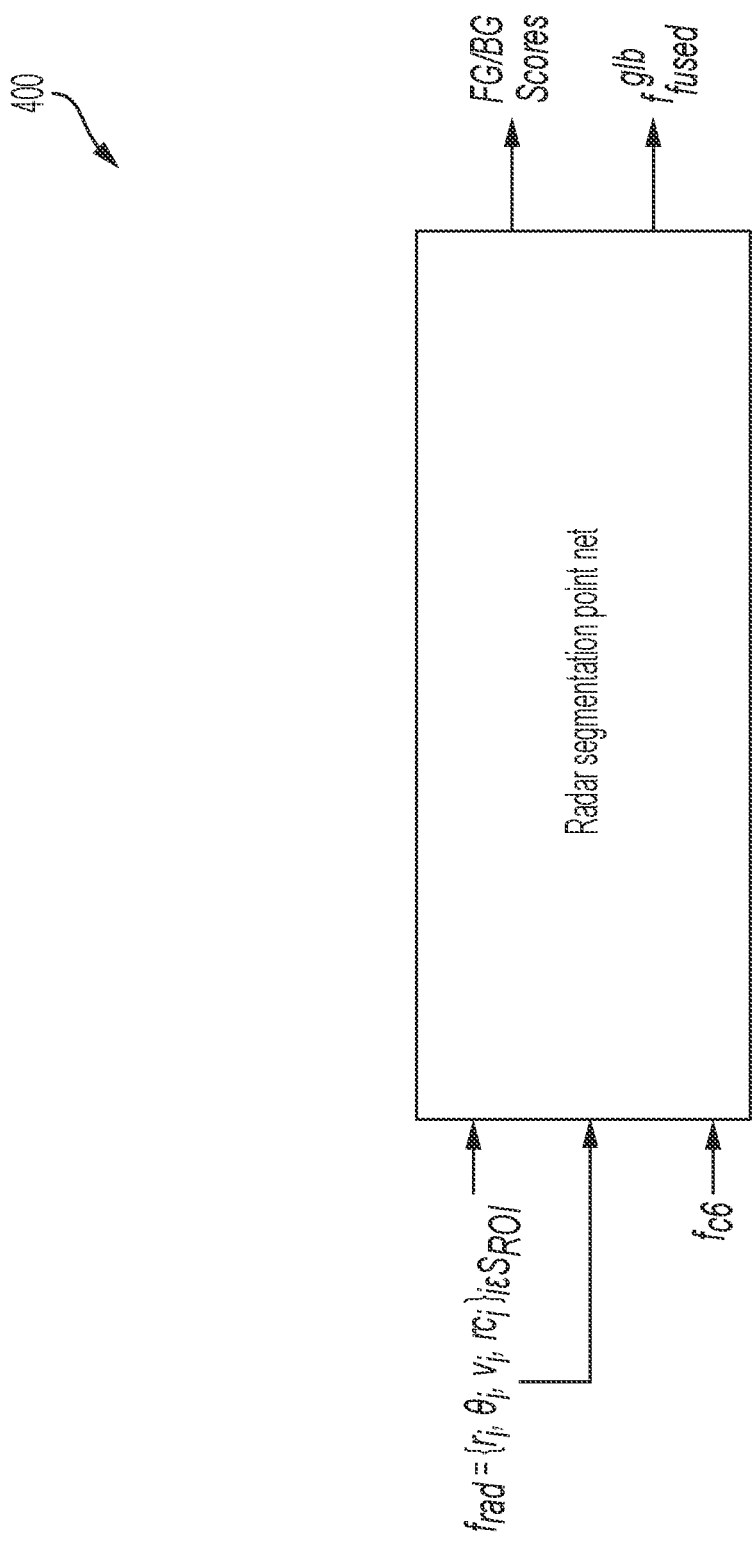
FIG. 4 shows a schematic diagram of the radar data neural network of FIG. 3 in another embodiment.

FIG. 4 shows a schematic diagram 400 of the radar data neural network 308 of FIG. 3 in another embodiment. Radar data is input in the form of radar parameters, such as range $r_i$, azimuth $\theta_i$, velocity $v_i$, and radar cross-section $rc_i$ that are within a selected region of interest ($i \in S_{ROI}$). The radar data neural network 308 also receives image data from the image neural network. In various embodiments, the received image data is received from a final convolutional network layer of the image neural network (e.g, $f_{C6}$). The radar data neural network 308 generates at least two outputs: a foreground/background (FG/BG) score and a fused data set $f_{fused}^{glb}$ that includes a fusion of image data and radar data.

Figure 5:
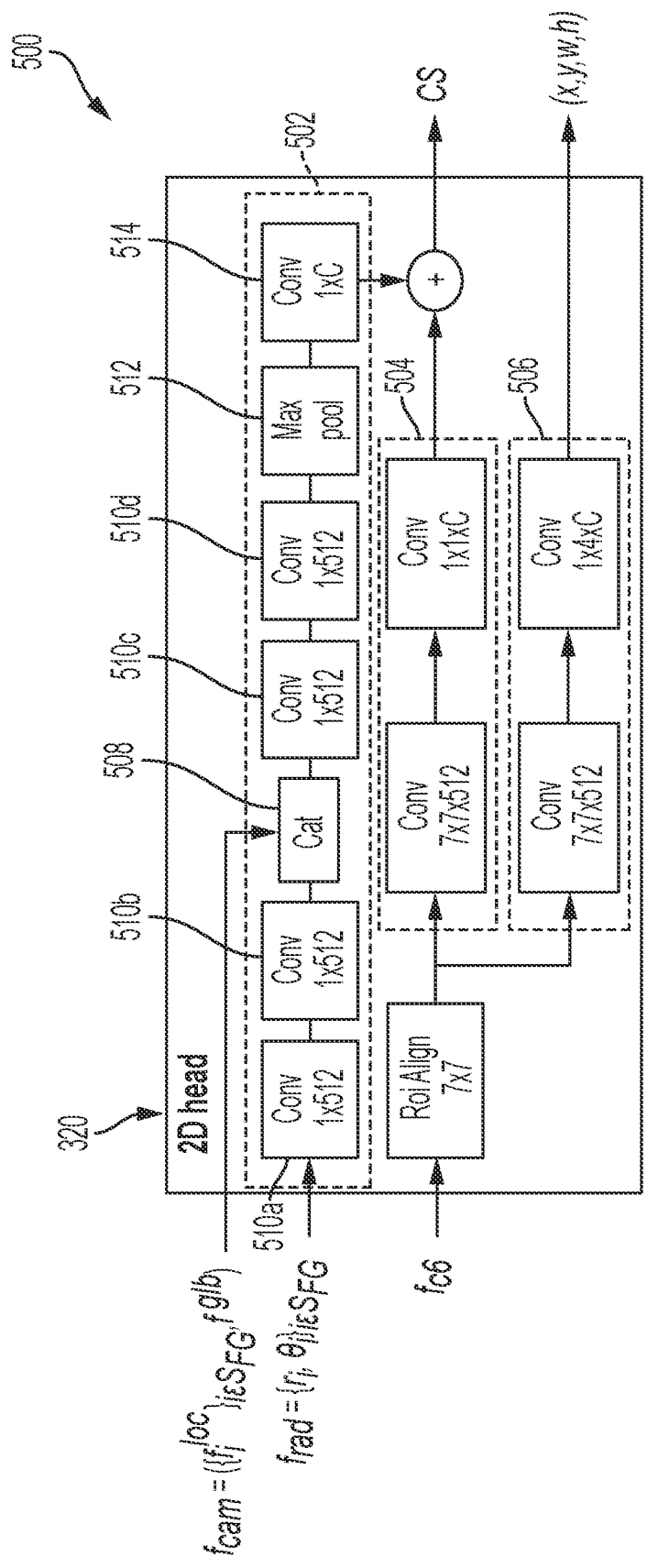
FIG. 5 shows a schematic diagram displaying details of the two-dimensional (2D) head of the object detection system.

FIG. 5 shows a schematic diagram 500 displaying details of the two-dimensional (2D) head 320 of the object detection system 200. The 2D head 320 includes a radar convolutional neural network 502 including a plurality of convolution layers (510a, . . . 510d) operating on the radar data. The radar convolutional neural network 502 performs convolutions on range and azimuth parameters received from the radar data neural network 308. The range and azimuth parameters are provided for pixels in the radar data that have been identified as foreground ($i \in FG$). A concatenation layer 508 between an $i^{th}$ convolutional layer and an $(i+1)^{th}$ convolution layer concatenates an output from the $i^{th}$ convolutional layer with camera feature data. In the illustrative embodiment, the $i^{th}$ convolution layer is convolution layer 510b and the $(i+1)^{th}$ convolution layer is convolution layer 510c. The concatenation layer includes feature data $\{f_i^{loc}\}_{i \in FG}$ and global fused data into the data from the $i^{th}$ convolution layer. A pooling layer 512 performs maximum pooling on the output of the final convolutional layer (e.g. 510d) and a one-dimensional convolution layer 514 performs a convolution on the pooled data in order to generate a classification score (CS).

The image feature layer data $f_{C6}$ is sent through a first image convolution branch 504 and a second image convolution branch 506. The output from the first image convolution branch 504 produces a classification score. The classification score from the radar convolutional neural network 502 and the classification score from the first image convolution branch 504 are combined in order to generate a final classification score (CS) for the object. The output from the second image convolution branch 506 generates a pixel location, width and height (x, y, w, h) of a 2D boundary box surrounding the object.

Figure 6:
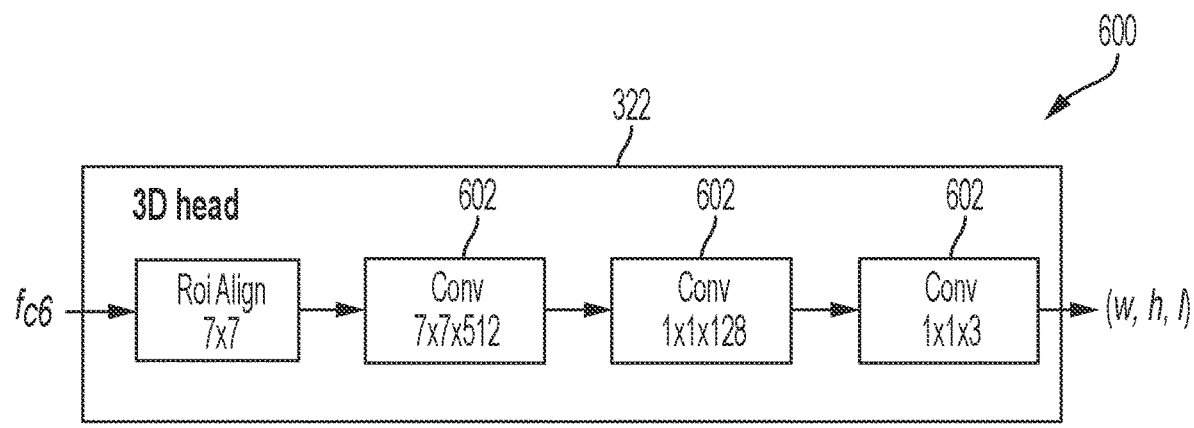
FIG. 6 shows a schematic diagram displaying details of the 3D head of the object detection system.

FIG. 6 shows a schematic diagram 600 displaying details of the 3D head 322 of the object detection system 200. The 3D head 322 includes multiple convolutional network layers 602 that operate on the ROI alignment image data $f_{C6}$ received at the 3D head 322 from the image neural network 302. The 3D head 322 outputs a width, length and height (w, l, h) of a three-dimensional boundary box in the image data surrounding the object.

Figure 7:
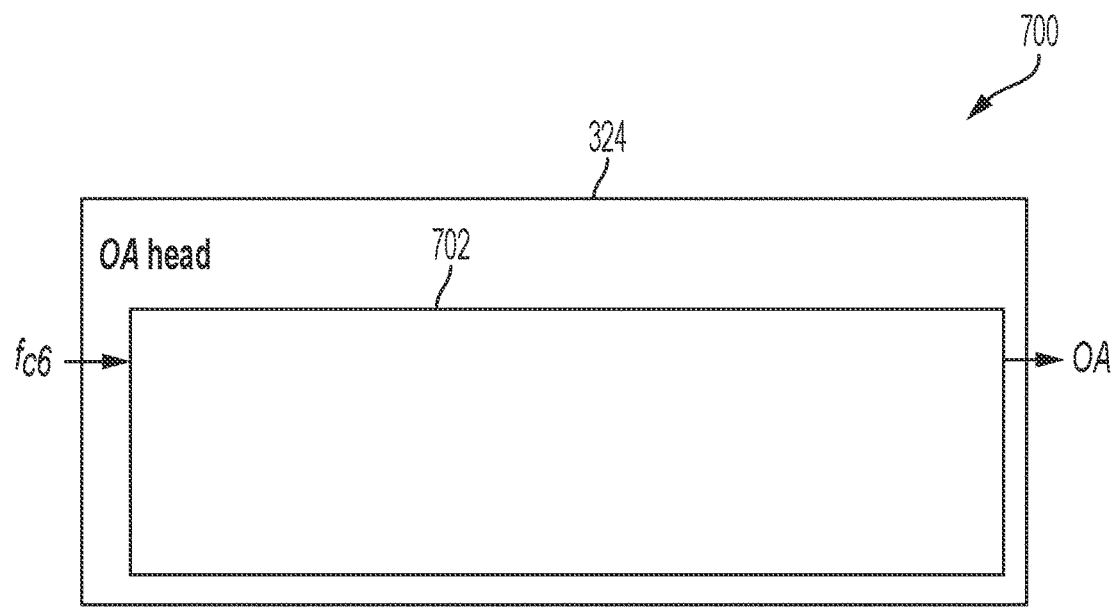
FIG. 7 shows a schematic diagram displaying details of the observation angle head of the object detection system.

FIG. 7 shows a schematic diagram 700 displaying details of the observation angle head 324 of the object detection system 200. The observation angle head 324 includes convolutional network layers 702 that operates on the ROI alignment image data $f_{C6}$ received as input to the observation angle head 324 and outputs an observation angle OA indicating a location of the object within the image.

Figure 8:
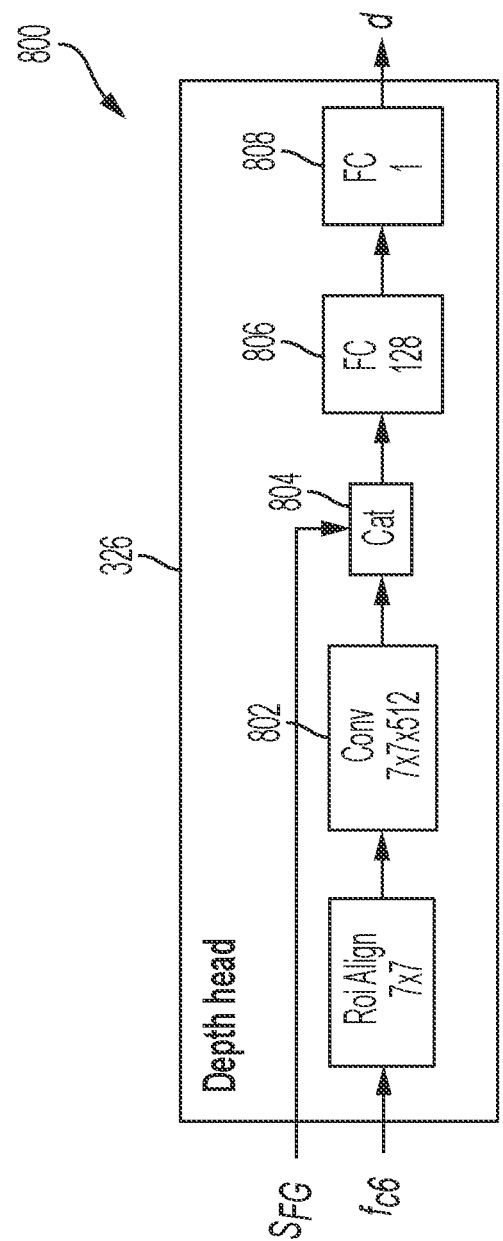
FIG. 8 shows a schematic diagram displaying details of the depth head.

FIG. 8 shows a schematic diagram 800 displaying details of the depth head 326. The depth head 326 includes a convolutional network layer 802 that performs a convolution on the ROI alignment image data $f_{C6}$ received at the depth head 326 from the image neural network 302. The depth head 326 further receives the radar parameters of range and azimuth from the radar data neural network 308. The range and azimuth parameters are for pixels in the image data that have been identified as foreground pixels ($f_{rad} = \{r_i, \theta_i\}_{i \in FG}$). A concatenation layer 804 fuses the radar parameters with the output of the convolutional network layer 802. The fused data passes through one or more fully connected layers 806, 808 in order to determine a range indicating a distance d from the radar system or vehicle to the object.

Figure 9:
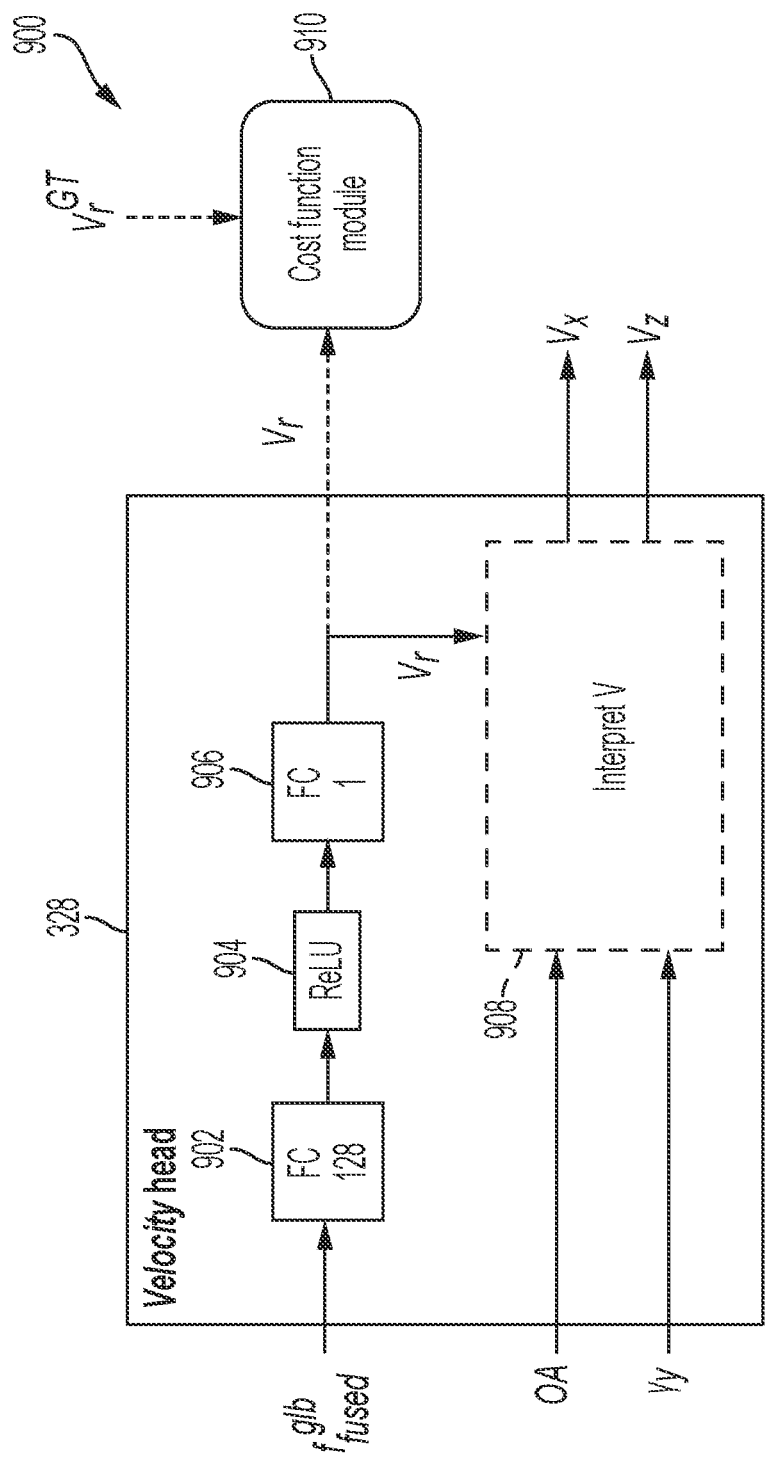
FIG. 9 discloses details of a velocity head for determining $v_x$- and $v_y$-components for a velocity of the object.

FIG. 9 discloses details 900 of a velocity head 328 for determining $v_x$- and $v_z$-components for a velocity of the object. The velocity head 328 receives the global fused data from the radar data neural network 308 and the observation angle OA and azimuth angle $\gamma_y$ from the observation angle head 324. The fused data passes through a first convolution layer 902, a ReLU activation layer 904, and a second convolution layer 906 in order to generate a radial velocity $V_r$ for the object. The radial velocity, the observation angle and the azimuth angle are combined at a velocity interpreter 908 in order to determine the $v_x$ and $v_z$ components of the velocity of the object, as discussed below.

A first angle $\theta$ is defined from the azimuth angle, as shown in Eq. (1):

$$\theta = -\gamma_y \qquad \text{Eq. (1)}$$

A second angle $\varphi$ is defined from the observation angle and azimuth, as shown in Eq. (2):

$$\varphi = OA - \gamma_y + \pi/2 \qquad \text{Eq. (2)}$$

The total velocity of the object is related to the first angle, second angle and radial velocity as shown in Eq. (3):

$$V = V \cos(\gamma_y) \qquad \text{Eq. (3)}$$

The $v_x$ component can then be determined as shown in Eq. (4):

$$V_x = V \cos(\gamma_y) \qquad \text{Eq. (4)}$$

and $v_y$ component can be determined as shown in Eq. (4):

$$V_z = V \sin(\gamma_y) \qquad \text{Eq. (5)}$$

In an embodiment, a trained network system can be used to provide a range of an object without any radar data being input into the network. In other words, the trained network is able to determine the range of the object using only image data.

In various embodiments, during training of the network system the radial velocity can be provided to a cost function module 910. The cost function module 910 creates a cost function using the radial velocity determined by the network system and a ground truth radial velocity. By minimizing the cost function, weights and coefficients of the network system can be altered in order to train the network system.

Figure 10:
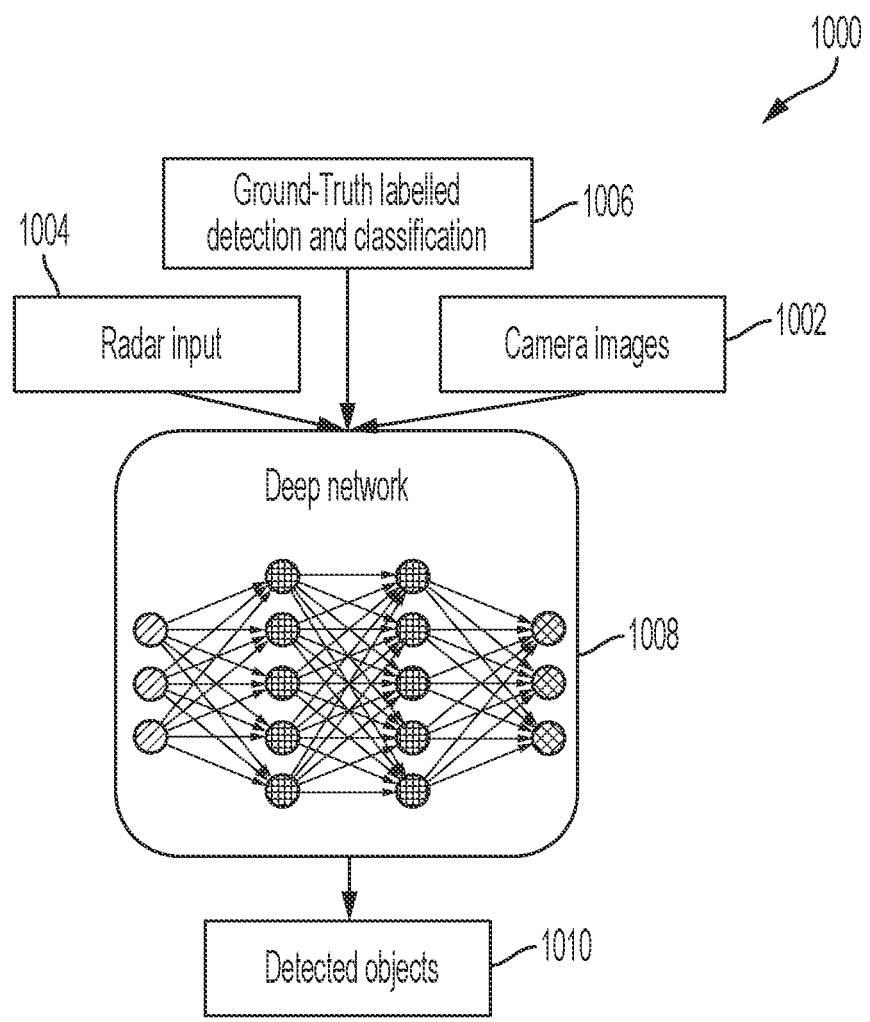
FIG. 10 shows a schematic diagram for training a neural network for object detection.

FIG. 10 shows a schematic diagram 1000 for training a neural network 1008 for object detection. A dataset of images 1002, radar inputs 1004, and ground truth detections 1006 related to an object are collected. The neural network 1008 is trained to detect and classify the objects 1010 using this input.

Figure 11:
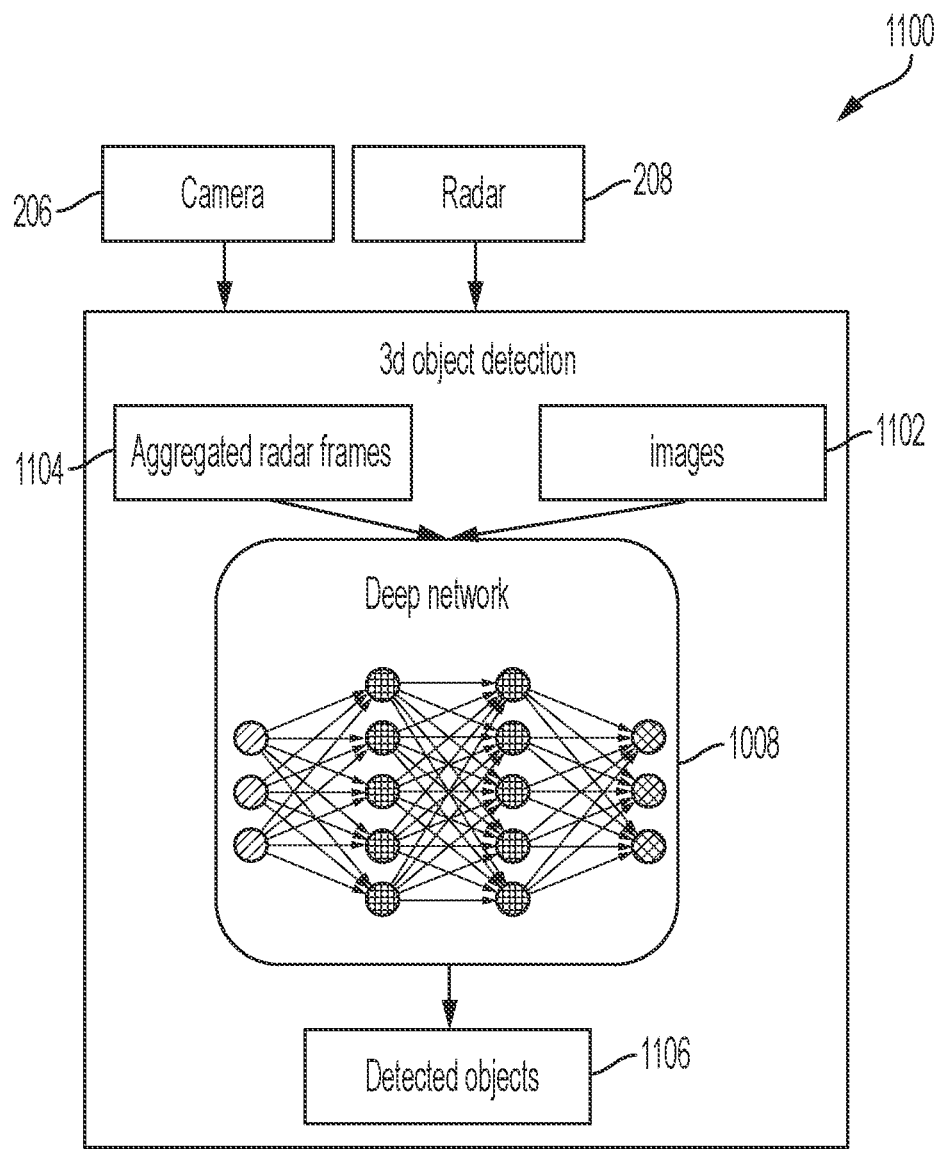
FIG. 11 shows a schematic diagram for using the trained neural network of FIG. 10 in an inference phase for detecting an object.

FIG. 11 shows a schematic diagram 1100 for using the trained neural network 1008 of FIG. 10 in an inference phase for detecting an object. The trained network is fed with sensor input from camera backbone 206 and radar backbone 208. The network therefore receives image data 1102 and aggregated radar data 1104 as input and outputs a detection of an object 1106 based on this input data.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of detecting an object at a vehicle, comprising:
   proposing a boundary box for the object in image data received at an image neural network;
   receiving the boundary box and fused set of data at a two-dimensional head including a convolutional neural network having a plurality of convolution layers, the fused set of data including as fusion of radar data and image data;
   performing a convolution of the radar data at the plurality of convolution layers;
   concatenating the fused set of data into the radar data at a concatenation layer disposed between two of the plurality of convolution layers; and
   performing a one-dimensional convolution on the concatenated data to determine a radar classification score for the object.

2. The method of claim 1, wherein the two-dimensional head further includes a first image convolutional branch, further comprising receiving image data at the first image convolutional branch to generate an image classification score and determining a final classification score from the radar classification score and the image classification score.

3. The method of claim 1, further comprising determining a two-dimensional velocity vector of the object from the image data and radar data.

4. The method of claim 3, further comprising determining an observation angle for a proposed three-dimensional boundary box, determining a radial velocity of the object from the fused set of data, and determining the two-dimensional velocity vector using the observation angle and the radial velocity.

5. The method of claim 3, further comprising training a depth head with radar data and image data to determine a range of an object, and using the trained depth head to determine the range of the object using only the image data.

6. The method of claim 1, further comprising determining at least one of: (i) a dimension of the boundary box; (ii) an observation angle of the object; (iii) a depth of the object; and (iv) a two-dimensional velocity of the object.

7. The method of claim 1, wherein the radar data further comprises a plurality of radar frames that are temporally spaced from each other, the method further comprising aggregating the plurality of radar frames and fusing the aggregated radar data with the image data to obtain the fused set of data.

8. A system for detecting an object at a vehicle, comprising:
   an image neural network that receives image data related to the object and proposes a boundary box for the object from the image data; and
   a two-dimensional head including a convolutional neural network having a plurality of convolution layers, wherein the two-dimensional head is configured to:
   receive the boundary box and a fused set of data including as fusion of radar data and image data;
   perform a convolution of the radar data at the plurality of convolution layers;
   concatenate the fused set of data into the radar data at a concatenation layer disposed between two of the plurality of convolution layers; and
   perform a one-dimensional convolution on the concatenated data to determine a radar classification score for the object.

9. The system of claim 8, wherein the two-dimensional head further includes a first image convolutional branch and is further configured to receive image data at the first image convolutional branch to generate an image classification score and determine a final classification score from the radar classification score and the image classification score.

10. The system of claim 8, further comprising a velocity head configured to determine a two-dimensional velocity vector of the object from the image data and the radar data.

11. The system of claim 10, further comprising an observation angle head configured to determine an observation angle for a proposed three-dimensional boundary box, wherein the velocity head is configured to determine a radial velocity of the object from the fused set of data, and the two-dimensional velocity vector using the observation angle and the radial velocity.

12. The system of claim 10, further comprising a depth head including a trained network, wherein the trained network determines a range of the object using only the image data.

13. The system of claim 8, wherein the parameter of the object further comprises at least one of: (i) a dimension of the boundary box; (ii) an observation angle of the object; (iii) a depth of the object; and (iv) a two-dimensional velocity of the object.

14. The system of claim 8, further comprising a temporal aggregator configured to aggregate a plurality of temporally spaced radar frames.

15. A vehicle, comprising:
   an image neural network that receives image data and proposes a boundary box from the image data and an object proposal; and
   a two-dimensional head including a convolutional neural network having a plurality of convolution layers, wherein the two-dimensional head is configured to:
   receive the boundary box and a fused set of data including as fusion of radar data and image data;
   perform a convolution of the radar data at the plurality of convolution layers;
   concatenate the fused set of data into the radar data at a concatenation layer disposed between two of the plurality of convolution layers; and
   perform a one-dimensional convolution on the concatenated data to determine a radar classification score for the object.

16. The vehicle of claim 15, wherein the two-dimensional head further includes a first image convolutional branch and is further configured to receive image data at the first image convolutional branch to generate an image classification score and determine a final classification score from the radar classification score and the image classification score.

17. The vehicle of claim 15, further comprising a velocity head configured to determine a two-dimensional velocity vector of the object from the image data and the radar data.

18. The vehicle of claim 17, further comprising an observation angle head configured to determine an observation angle for a proposed three-dimensional boundary box, wherein the velocity head is configured to determine a radial velocity of the object from the fused set of data, and the two-dimensional velocity vector using the observation angle and the radial velocity.

19. The vehicle of claim 18, further comprising a depth head including a trained network, wherein the trained network determines a range of the object using only the image data.

20. The vehicle of claim 15, wherein the parameter of the object further comprises at least one of: (i) a dimension of the boundary box; (ii) an observation angle of the object; (iii) a depth of the object; and (iv) a two-dimensional velocity of the object.

* * * * *